(12) United States Patent
Kurtz

(10) Patent No.: US 6,591,686 B1
(45) Date of Patent: Jul. 15, 2003

(54) OIL FILLED PRESSURE TRANSDUCER

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/082,012

(22) Filed: Feb. 20, 2002

(51) Int. Cl.[7] ................................................. G01L 9/06
(52) U.S. Cl. ....................................................... 73/721
(58) Field of Search ........................... 73/721, 717, 727, 73/715, 115, 756, 720; 338/42

(56) References Cited

U.S. PATENT DOCUMENTS

| | | | |
|---|---|---|---|
| 4,406,993 A | 9/1983 | Kurtz | 338/42 |
| 5,973,590 A | 10/1999 | Kurtz et al. | 338/42 |
| 5,999,082 A | 12/1999 | Kurtz et al. | 338/42 |
| 6,210,989 B1 | 4/2001 | Kurtz et al. | 438/51 |
| 6,272,929 B1 | 8/2001 | Kurtz et al. | 73/727 |
| 6,330,829 B1 | 12/2001 | Kurtz et al. | 73/717 |

Primary Examiner—Hezron Williams
Assistant Examiner—Marissa Ferguson
(74) Attorney, Agent, or Firm—Duane Morris, LLP

(57) ABSTRACT

An oil filled pressure transducer utilizes a leadless sensor which is secured to a header comprising a glass pre-form and a header shell. The glass pre-form contains holes which accept header pins and another aperture or hole which accepts the oil fill tube. The diameter of the sensor is chosen to be almost as large as the inner diameter of the shell. In this manner, there is a small cut out over the portion of the sensor that would otherwise cover the oil fill tube. The sensor is mounted to the header using glass bonds. There is a very small space between the outer diameter of the sensor and the inner diameter header housing, which is filled with glass used to mount the sensor. Since there are no ball bonds or gold wires in the area between the surface of the sensor and the diaphragm, the distance between the sensor and metal diaphragm is drastically reduced, thereby substantially reducing the backpressure problem.

10 Claims, 4 Drawing Sheets

OIL FILLED PRESSURE TRANSDUCER

FIELD OF INVENTION

The present invention relates generally to an oil filled pressure transducer and a method for making such a transducer and more particularly, to an oil filled pressure transducer having a lower backpressure when temperature is increased.

BACKGROUND OF THE INVENTION

Oil filled pressure transducers are well known. The prior art shows such devices that have been used with oil, which oil or fluid is employed as a force-transmitting medium. In such devices, the pressure is applied to a transducer diaphragm, and typically these devices employ a metal diaphragm as a force collector. Such oil filled transducers are known in the art. For example, see U.S. Pat. No. 4,406,993 entitled, "Oil Filled Pressure Transducers" issued on Sep. 27, 1983 to Anthony D. Kurtz, the inventor herein, and assigned to Kulite Semiconductor Products, Inc., the assignee herein. See also U.S. Pat. No. 6,330,829 entitled, "Oil Filled Pressure Transducer" issued Dec. 18, 2001 to A. D. Kurtz et al., the inventor herein, and assigned to Kulite Semiconductor Products, Inc., the assignee herein.

It is well known that the deflection ($\delta$)of a clamped edge diaphragm of thickness (t) and radius (a)is given by:

$$\delta = \frac{3Pa^4(m^2-1)}{16Em^2t^3}$$

Where m=reciprocal of Poisson's Ration
P=pressure
E=Young Modulus

In an oil-filled pressure transducer, the sensor element is isolated from the pressure media by means of a thin metal diaphragm and the pressure is transmitted to the sensor by means of a volume of oil mainly in the form of a film between the metal diaphragm and the sensor. This is, of course, indicated in the above-noted patents. In any event, when the temperature increases, the oil expands and pushes against the metal diaphragm thus exerting a backpressure against the sensor leading to an error signal. This problem is known and is addressed and explained in U.S. Pat. No. 5,999,082 entitled, "Compensated Oil Filled Pressure Transducer" issued on Dec. 7, 1999 to A. D. Kurtz et al., the inventor herein and assigned to the assignee herein. In that patent, the object was to reduce errors at very low pressure caused by the oil exerting a tension on the deflecting portion of the diaphragm.

It is an object of the present invention to reduce the oil volume to a minimum volume expansion and thus reduce the error causing backpressure.

PRIOR ART DESCRIPTION

Referring to FIG. 1, there is shown a prior art oil filled pressure transducer. In FIG. 1 the sensor 10 is mounted on a header assembly or header shell 11. This is usually accomplished by mounting the sensor 10 with the contact areas exposed and ball-bonding gold wires form the contact areas to the pins of the header. In FIG. 1, the pins of the header are designated by the reference numeral 12 and the contact areas 14 of the sensor 10 are bonded by means of gold wires 15 to the terminal areas 17, which are connected to the output or header pins 12. The header shell 11 has a top opening surrounded by a peripheral flange 21. A metal diaphragm (not shown) is secured to cover the opening.

To reduce the oil volume, an annular ceramic substrate 18, contains apertures 20 for the pins 12 and terminal areas 17. The substrate 18 is mounted on the header and the sensor 10 is mounted within the central hole 13 of the ceramic substrate 18. The thickness of the ceramic is chosen to be slightly less than the height of the pins 12, but slightly thicker than the height of the sensor. This is shown in FIG. 3B.

Referring to FIG. 3A, there is shown a top view of the prior art sensor of FIG. 1 and a cross sectional view in FIG. 3B showing the ceramic header with the sensor contact area 14 bonded to the pin 12 by a gold wire 15. It is also seen in FIG. 1 and FIG. 3 that there is an oil tube 22 which enables one to place oil within the sensor. As seen in FIG. 3A, there is an oil cavity 25 about each pin, there is an oil cavity 26 about the ceramic substrate and there is an oil cavity 28 around the sensor. This is also shown clearly in the view of FIG. 1. One can also see in FIG. 3B that the thickness of the ceramic substrate 18 is slightly less than the height of the pins 12, but slightly thicker than the height of the sensor. As seen, a wire 15 bonds the contact area 14 of the sensor to the terminal area 17 of the pin 12.

However, when ball-bonds are made to the gold wire which connects the sensors to the pins, both the wire and the ball-bonds are slightly elevated (looped) with respect to the ceramic 18. To prevent the metal isolation diaphragm 40 (FIG. 3B) which covers the top of the sensor from touching the wires 15 or the ball-bonds, a gap on the order of 0.01 to 0.015 inches must be left between the ceramic substrate 18 and the metal isolation diaphragm 40. This criterion contributes to increase the oil volume. In addition, the ceramic substrate 18 is mounted in a recess in the header 11 in order to insert the ceramic 18 over the pins 12, there must be a small difference in the inner diameter of the recess and the outer diameter of the ceramic 18. This also contributes to an increase in oil volume. It is therefore desirable to decrease the oil volume to an absolute minimum to avoid or reduce backpressure.

SUMMARY OF INVENTION

An oil filled pressure transducer utilizes a leadless sensor which is secured to a header comprising a glass pre-form and a header shell. The glass pre-form contains holes which accept header pins and another aperture or hole which accepts the oil fill tube. The diameter of the sensor is chosen to be almost as large as the inner diameter of the shell. In this manner, there is a small cut out over the portion of the sensor that would otherwise cover the oil fill tube. The sensor is mounted to the header using glass bonds. There is a very small space between the outer diameter of the sensor and the inner diameter header housing, which is filled with glass used to mount the sensor. Since there are no ball bonds or gold wires in the area between the surface of the sensor and the diaphragm, the distance between the sensor and metal diaphragm is drastically reduced, thereby substantially reducing the backpressure problem.

DETAILED DESCRIPTION OF THE FIGURES

Figure 1:
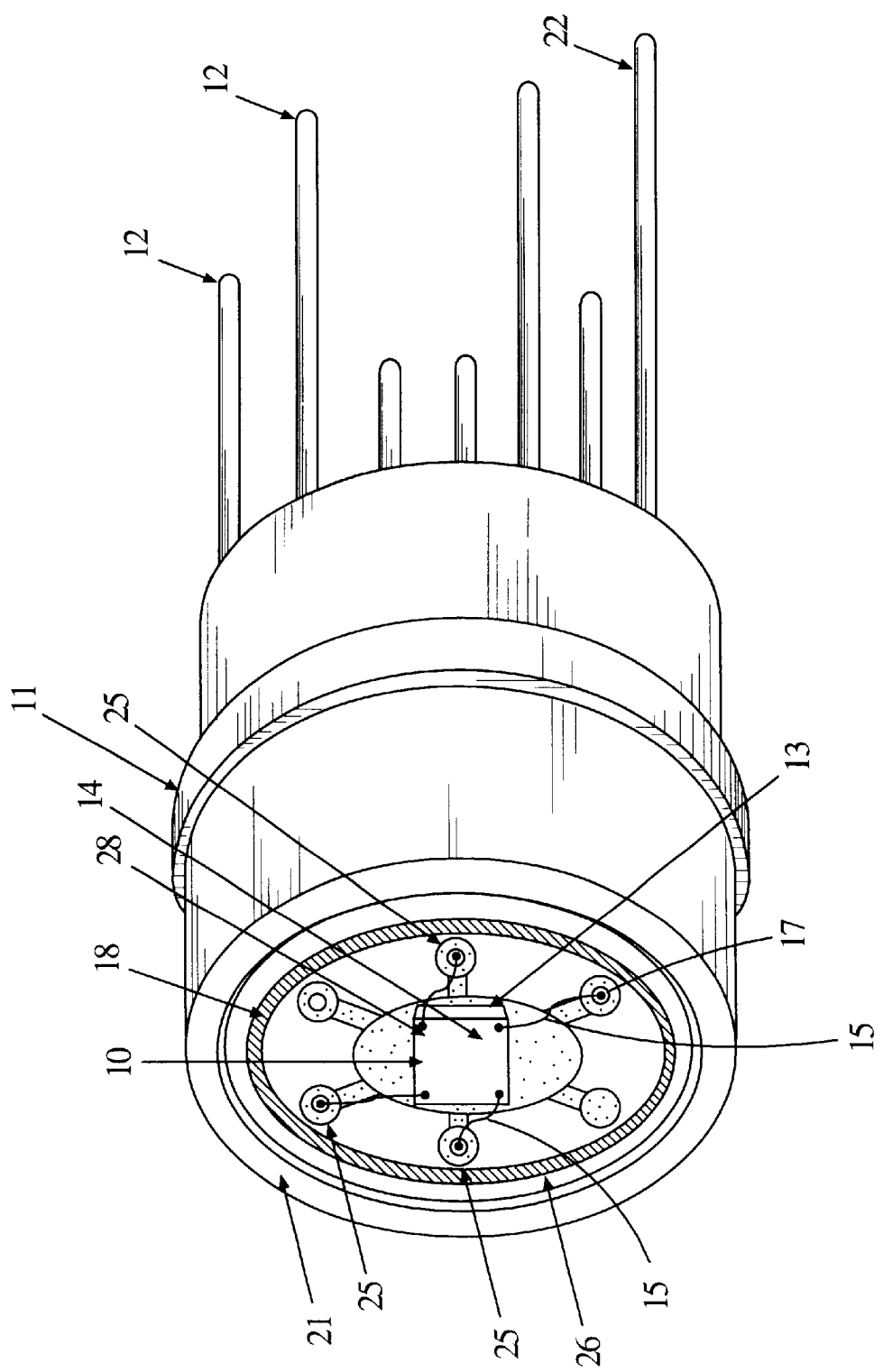
FIG. 1 is a perspective view of a prior art oil filled transducer without a metal diaphragm cover.
Figure 2:
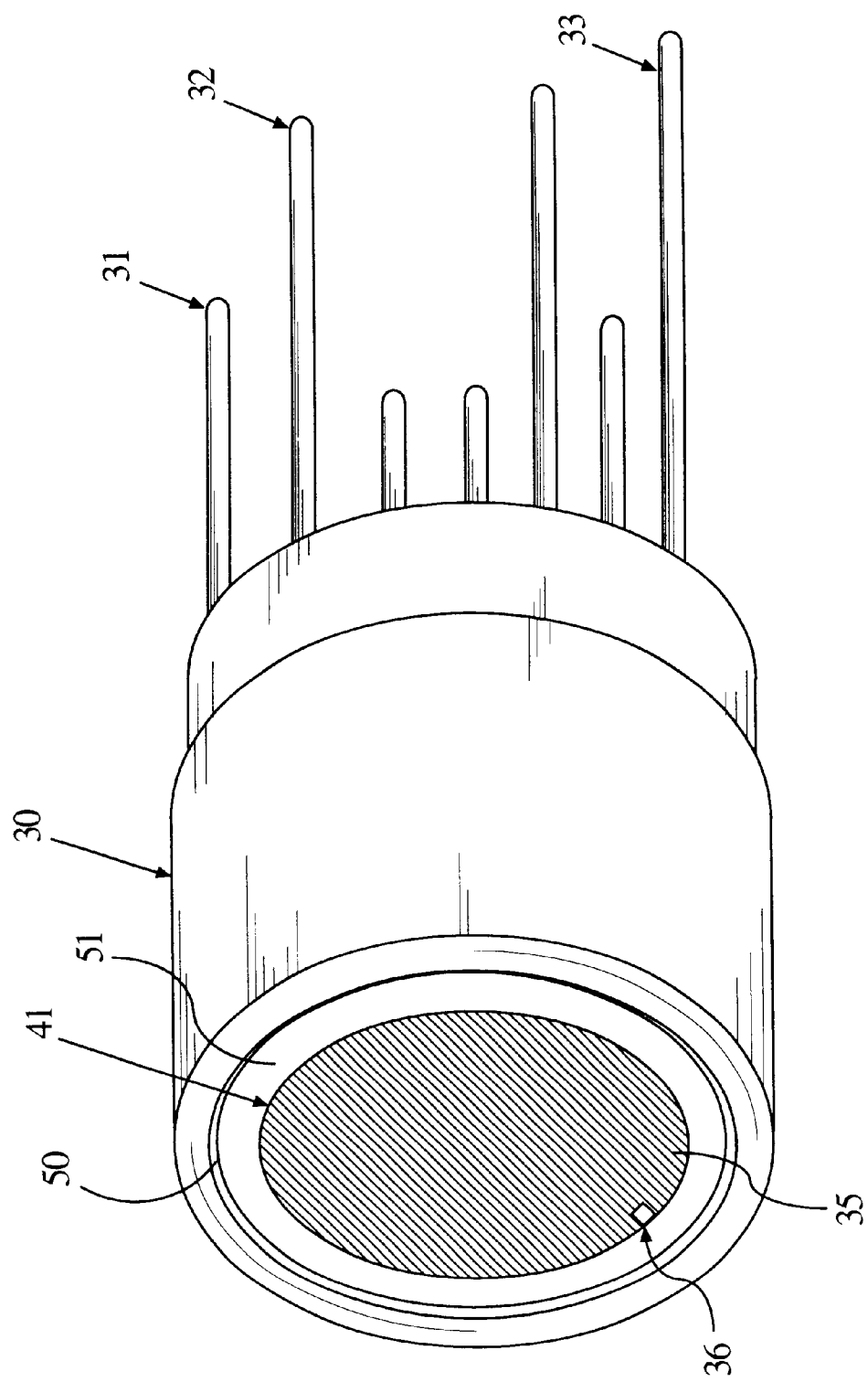
FIG. 2 is a perspective view of an improved oil filled transducer according to this invention.

Referring to FIG. 2, there is shown an oil filled pressure transducer according to this invention. Essentially, the transducer of FIG. 2 includes a header shell 30 which includes pins 31 (12 of FIG. 1) and an oil tube 33 (22 of FIG. 3), as in the prior art sensor shown in FIG. 1. As will be explained, this unit includes a leadless sensor device 41 (FIG. 4B), which is associated with a small oil cavity 36, as compared to the many oil cavities of the prior art device. As can be seen, there is a similarity between the general appearance of the device of FIG. 1 and that device of FIG. 2. The header 30 also has a peripheral flange 50 about the top opening 51. The opening as covered by a metal diaphragm 40 (FIG. 3B).

Figures 4A, 4B:
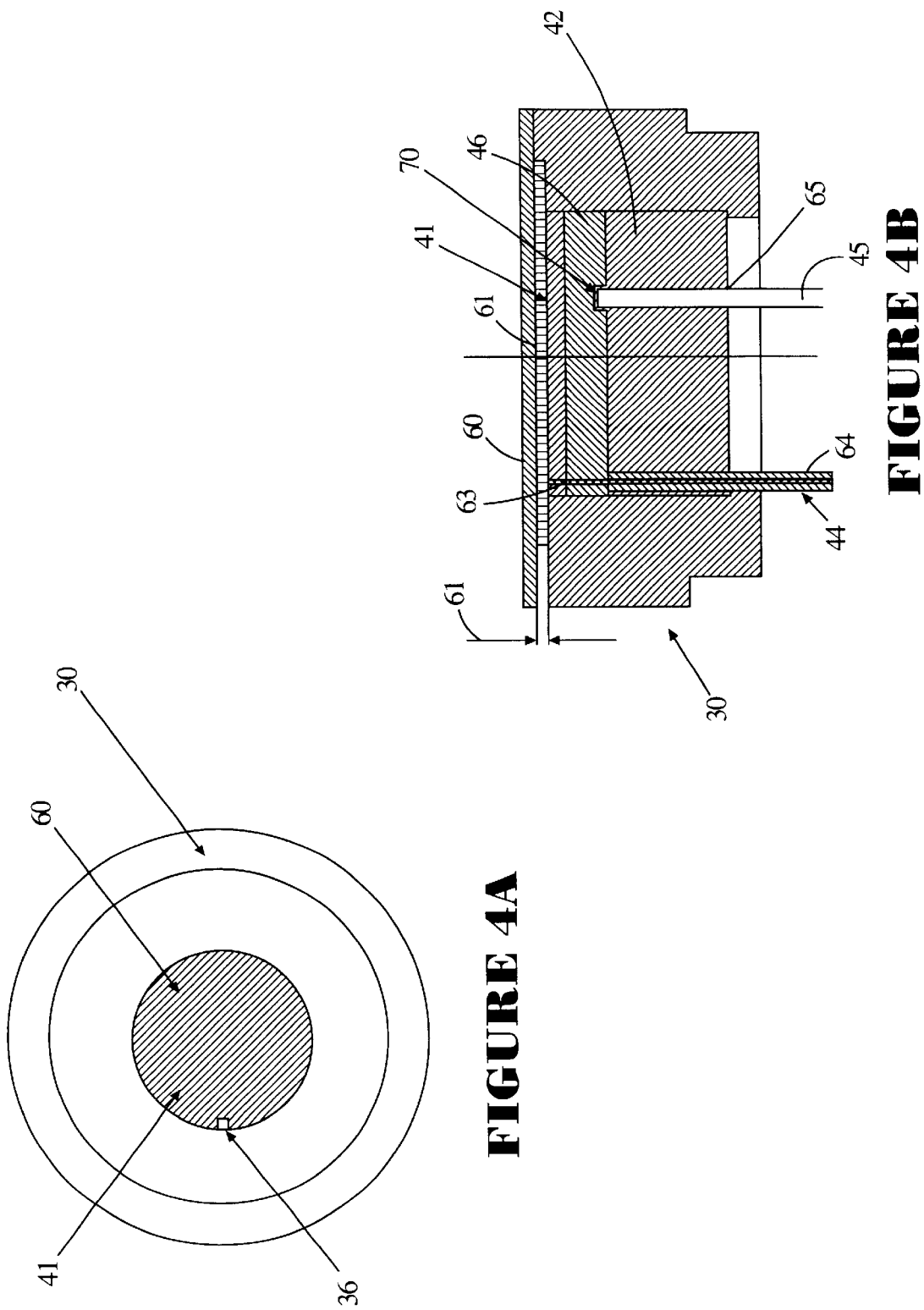
FIG. 4 consists of FIG. 4A which is a top view of the inventive sensor of FIG. 2 and FIG. 4B, which is a cross sectional view of the inventive sensor of FIG. 2.

Referring to FIG. 4A, there is shown a top view of the sensor of FIG. 2 and a cross sectional view (FIG. 4B) beneath the top view of the sensor of FIG. 2. The sensor of this invention is a leadless sensor device 41. Leadless sensors have been developed by Kulite Semiconductor Products, Inc., the assignee herein. For examples of such sensor devices, reference is made to U.S. Pat. No. 6,272,929 entitled, "High Pressure Piezoresistor Transducer Suitable for Use in Hostile Environments" issued on Aug. 14, 2001 to Anthony D. Kurtz et al. See also U.S. Pat. No. 6,210,989 entitled, "Ultra Thin Surface Mount Wafer Sensor Structure and Methods for Fabricating the Same" issued on Apr. 3, 2001 to A. D. Kurtz et al. and assigned to Kulite Semiconductor Products, Inc., the assignee herein. See also U.S. Pat. No. 5,973,590 entitled, "Ultra Thin Surface Mount Wafer Sensor Structure and Methods of Fabricating the Same" issued on Oct. 26, 1999 to A. D. Kurtz et al.

Basically, these patents show leadless semiconductor sensor devices which include a semiconductor diaphragm having a top surface coating of an oxide layer. There are P+ sensor elements fusion bonded to the oxide layer at a relatively central area of the diaphragm. There are P+ finger elements fusion bonded to the oxide layer which extend from the sensors to an outer contact location of the diaphragm for each of the fingers and an external layer with P+ material fusion bonded to the oxide layer and surrounding the sensors and fingers. A glass wafer is electrostatically bonded at the bottom surface to the fingers and rim to hermetically seal the sensors and fingers of the diaphragm member. The glass wafer includes a depression above the sensors and has a plurality of apertures where each aperture is associated a separate finger at the contact location, and each aperture is smaller than the associated finger lining up with the contact location. Each contact location can be accessed via the associated aperture.

Figures 3A, 3B:
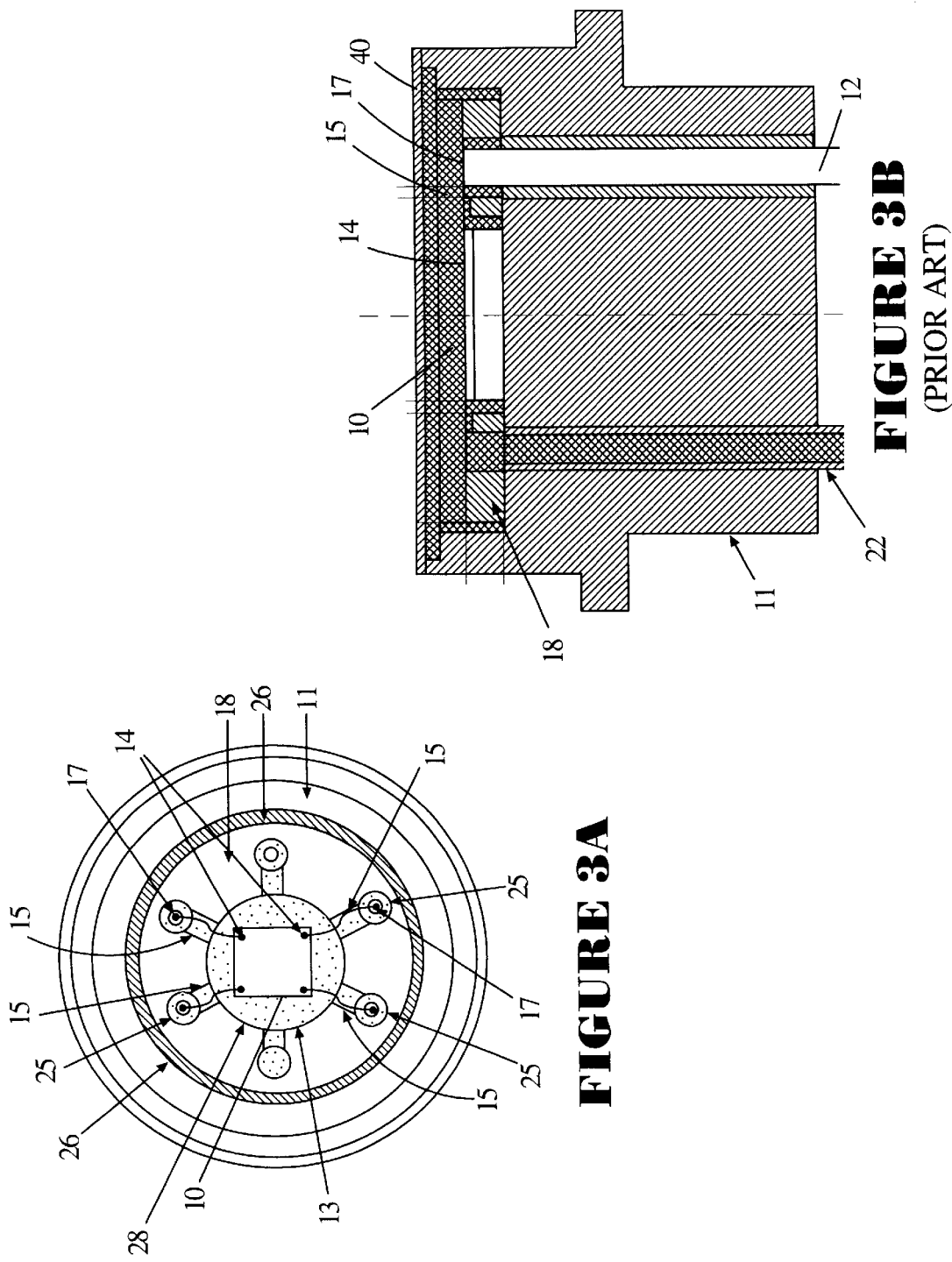
FIG. 3 consists of a top view FIG. 3A of the prior art transducer and a cross sectional view FIG. 3B of the prior art transducer as shown in FIG. 1.

The sensor basically is a leadless device in the sense that the header pins of the diaphragm are coplanar with the top surface of the glass wafer and hence these transducers are extremely thin and do not have the conventional wire leads as shown, for example, in the prior art sensor of FIG. 3. The wires are gold wires ball bonded between a sensor contact area 14 and a terminal area 17 connected to the pin 12 (FIG. 3B). The sensors described in the above-noted patents do not have wires bonded to pins, but utilize the P+ finger elements which are fusion bonded to outer contact locations as shown in the above patents, all of which are incorporated herein by reference.

The header includes a header shell 30 and a glass pre-form 42. The oil fill tube 44 is directed through an aperture 64 in the glass 42 and communicates with an aperture 63 in the transducer. The glass pre-form 46 contains five holes. Four of the holes accept the header pins as hole 65 for pin 45, while the other hole 64 accepts the oil filled tube 44. The pins 45 are about 0.01 inches in diameter and protrude about 0.005 inches from the top surface of the glass pre-form 42. The pin 45 is shown extending into the contact terminal percent of the leadless transducer 41. In addition, the oil filled tube 44 is located near the outside diameter of the glass and is about 0.03 inches in diameter. The pins 45 and the oil fill tube 44 are hermetically sealed to the glass pre-form during firing, as well as the header shell. The entire structure as shown in FIG. 4 is subjected to heat which causes the glass associated with the sensor 41 to be secured to the glass pre-form 42 by means of heat and using a frit, which essentially causes a hermetic seal to form. This seal secures the glass P form 42 to the glass layer 46 of the leadless sensor 41. The firing also secures the glass header 42 as well as the glass section 46 of the sensor to the header shell 30. The diameter of the sensor 41 is selected to be almost as large as the inner diameter of the metal shell 30. There is a small cut out 36 which is shown in the top view and also indicated in FIG. 2. The small cut out 36 is positioned over a portion of the sensor that would otherwise cover the oil fill tube 44. The sensor 41 is mounted to the header 30 using a metal glass frit (conductive) to bond the pins to the sensor contacts and a ceramic glass frit to join the rest of the sensor surface to the glass header. This enables the unit to then be fired using the glass frit and the ceramic glass frit to secure the parts together. Any space between the outer diameter of the sensor 41 and the inner diameter of the header housing 30 is filled by the glass frit, which is used to mount the sensor. This occurs when the unit is fired and the glass flows and fills the voids. It can easily be seen that the only region requiring oil is the region between the non-contact surface of the sensor and the metal diaphragm 60.

As seen in FIG. 4, the metal diaphragm 60 is secured to the header and basically covers the top of the sensor 41. The region requiring oil is shown by reference numeral 61 and is the region between the metal diaphragm 60 and the top portion of the sensor 41. Since there are no gold bonds or gold wires in the area between the surface and the sensor of the metal diagram, this region 61 is the only region requiring oil. Thus, the distance between the sensor 41 and the metal diaphragm is drastically reduced, leaving a gap, for example, of between 0.001 inch to 0.002 inches. This small gap and the ability to reduce almost to zero, the space between the outer diameter of the sensor 41 and the inner diameter of the header housing serves to reduce oil volume by at least an order of magnitude. Essentially, one can readily compute the expected deflection of the metal diaphragm for the two different structures and thus, the backpressure. (new (FIGS. 2 and 4) and prior art (FIGS. 1 and 3).

The deflection ($\delta$) for an increase of $\Delta P$ is given by the equation $\delta = h \times (dB/dT) \times \Delta T$. Where (h) is the height of the oil gap, $\Delta T$ is the temperature increase, (B) is the bulk compressibility of the oil and $dB/dT$ is the coefficient of thermal expansion of the oil. For silicon oil $dB/dT = 100 \times 10^{-5}/K°$.

Thus, for a difference of temperature of 100° K, $\delta = 0.1$ h, when h=0.001 inch, $\delta = 0.0001$ inch. However, when h=0.015 inches, $\delta = 0.0015$ inches, which is 15 times larger. Since the backpressure is directly proportional to $\delta$, the wider gap oil filled unit exhibits a backpressure 15 times larger, thus leading to a substantial error signal. It is therefore apparent that the apparatus shown, for example in FIGS. 2 and 4 are extremely desirable and exhibits a marked improvement in performance over prior art devices.

From the two cases assuming the following:

a=0.100 inches
t=0.001 inches
E=30×10$^6$ lb/in$^2$
m=3.3 the actual backpressures are:

$P_1$=2.64 PSI
$P_2$=0.18 PSI

Where $P_1$ is the backpressure for the wide gap case, which is the prior art device shown, for example, in FIG. 1 and in FIG. 3 and $P_2$ is the backpressure for the narrow gap case, which is the improved oil filled transducer shown in FIG. 2 and FIG. 4.

It should apparent to one skilled in the art that there are many modifications which can occur and all such are deemed to be in the spirit and scope of the claims as appended hereto.

What is claimed is:

1. An oil filled pressure transducer, comprising:

a glass pre-form having a plurality of pin accommodating apertures, a piezoresistive sensor mounted on said glass pre-form having a top semiconductor portion bonded to a bottom glass portion, said sensor having contact areas located in a bottom surface of said semiconductor portion and connected with conductive material contacting apertures in said glass portion to provide contact terminals at the bottom surface of said glass portion, said conductive material containing apertures of said glass aligned with said pin accommodating apertures of said glass pre-form, a plurality of conductive pins each inserted and associated with one of said pins accommodating apertures of said glass pre-form to contact said contact terminals of said glass portion, a header having a central aperture surrounded at a top surface by a peripheral flange, with said piezoresistive sensor as mounted on said pre-form secured in said aperture, a metal diaphragm covering said aperture and said top surface of said header to create a space between the top surface of said sensor and the bottom surface of said diaphragm, which space is determined by the height of said peripheral flange to provide an oil accommodating area between said diaphragm and sensor for containing a volume of oil only between the top surface of the sensor and the metal diaphragm to substantially reduce backpressure as compared to a conventional transducer of the same size.

2. The pressure transducer according to claim 1 wherein said height of said flange is about 0.001 inches.

3. The pressure transducer according to claim 1 wherein said pins are sealed to said glass pre-form by a hermetic seal.

4. The pressure transducer according to claim 1 wherein said sensor is secured to said glass pre-form by a glass frit bond.

5. The pressure transducer according to claim 1 wherein said sensor and said glass pre-from is secured to said header by a glass bond.

6. The pressure transducer according to claim 1 wherein said backpressure is reduced by a factor of at least 10 times as compared to a conventional transducer of the same size.

7. The pressure transducer according to claim 1 wherein said conductive pins are about 0.010 inches in diameter.

8. The pressure transducer according to claim 1 wherein said height of said peripheral flange is between 0.001 to 0.002 inches.

9. The pressure transducer according to claim 1 wherein the volume of oil contained is an order of magnitude less than required for a conventional sensor of the same size.

10. The pressure transducer according to claim 1 wherein said semiconductor portion of said sensor is fabricated from silicon.

* * * * *